United States Patent
Tsai et al.

(10) Patent No.: US 9,594,675 B2
(45) Date of Patent: Mar. 14, 2017

(54) VIRTUALIZATION OF CHIP ENABLES

(75) Inventors: Howard Tsai, Cupertino, CA (US);
Dmitry Vyshetsky, Cupertino, CA (US); Neal Meininger, San Jose, CA (US); Paul J. Gyugyi, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1117 days.

(21) Appl. No.: 12/651,378

(22) Filed: Dec. 31, 2009

(65) Prior Publication Data

US 2011/0161561 A1    Jun. 30, 2011

(51) Int. Cl.
*G06F 12/02* (2006.01)
*G06F 12/06* (2006.01)

(52) U.S. Cl.
CPC .......... *G06F 12/06* (2013.01); *G06F 12/0246* (2013.01); *G06F 2212/7201* (2013.01); *G06F 2212/7208* (2013.01)

(58) Field of Classification Search
CPC ............. G06F 12/06; G06F 2212/7201; G06F 12/0246; G06F 2212/7208
See application file for complete search history.

(56) References Cited

U.S. PATENT DOCUMENTS

| | | |
|---|---|---|
| 4,360,916 A | 11/1982 | Kustedjo et al. |
| 5,343,481 A | 8/1994 | Kraft |
| 5,533,035 A | 7/1996 | Saxena et al. |
| 5,603,001 A | 2/1997 | Sukegawa et al. |
| 5,734,926 A | 3/1998 | Feeley et al. |
| 5,787,279 A | 7/1998 | Rigoutsos |
| 5,878,279 A | 3/1999 | Athenes |
| 6,000,006 A * | 12/1999 | Bruce et al. ................. 711/103 |
| 6,119,196 A | 9/2000 | Muller et al. |
| 6,222,144 B1 | 4/2001 | Nishikawa |
| 6,223,144 B1 | 4/2001 | Barnett |
| 6,636,940 B1 | 10/2003 | Hodges |
| 6,760,743 B1 | 7/2004 | Heddes et al. |
| 6,772,276 B2 | 8/2004 | Dover |
| 6,985,977 B2 | 1/2006 | Vrancic |
| 7,100,103 B2 | 8/2006 | Mizrachi et al. |
| 7,237,016 B1 | 6/2007 | Schober |
| 7,386,683 B2 | 6/2008 | Blumrich et al. |
| 7,392,330 B2 | 6/2008 | Weatherspoon |
| 7,454,546 B1 | 11/2008 | Lilley |
| 7,457,897 B1 | 11/2008 | Lee et al. |

(Continued)

FOREIGN PATENT DOCUMENTS

| CN | 101419842 A | 4/2009 |
|---|---|---|
| CN | 101470663 A | 7/2009 |

(Continued)

OTHER PUBLICATIONS

8273A High Performance Programmable DMA Controller' datasheet by Intel, Oct. 1989.

(Continued)

*Primary Examiner* — Michael Alsip

(57) ABSTRACT

Virtual chip enable techniques perform memory access operations on virtual chip enables rather than physical chip enables. Each virtual chip enable is a construct that includes attributes that correspond to a unique physical or logical memory device.

18 Claims, 4 Drawing Sheets

(56) References Cited

U.S. PATENT DOCUMENTS

| | | |
|---|---|---|
| 7,603,523 B2 | 10/2009 | Blumrich et al. |
| 7,689,998 B1 | 3/2010 | Chrysanthakopoulos |
| 7,761,636 B2 | 7/2010 | Mott et al. |
| 7,877,254 B2 | 1/2011 | Luan et al. |
| 7,877,524 B1 | 1/2011 | Annem et al. |
| 7,979,615 B1 | 7/2011 | Spitzer |
| 8,103,836 B2 | 1/2012 | Blumrich et al. |
| 8,108,590 B2 | 1/2012 | Chow et al. |
| 8,694,750 B2 | 4/2014 | Vyshetsky et al. |
| 8,732,350 B2 | 5/2014 | Vyshetsky et al. |
| 2002/0078270 A1 | 6/2002 | Hofstee et al. |
| 2002/0161941 A1 | 10/2002 | Chue et al. |
| 2003/0172147 A1 | 9/2003 | Chang |
| 2004/0044811 A1 | 3/2004 | Vrancic |
| 2004/0186946 A1 | 9/2004 | Lee |
| 2005/0057973 A1* | 3/2005 | Khatami et al. ......... 365/185.33 |
| 2005/0097182 A1 | 5/2005 | Bishop et al. |
| 2005/0097183 A1 | 5/2005 | Westerlin |
| 2005/0160200 A1 | 7/2005 | Saito |
| 2005/0289253 A1 | 12/2005 | Edirisooriya et al. |
| 2006/0004931 A1 | 1/2006 | Weatherspoon |
| 2006/0075395 A1 | 4/2006 | Lee |
| 2006/0136570 A1 | 6/2006 | Pandya |
| 2006/0152981 A1 | 7/2006 | Ryu |
| 2006/0236039 A1 | 10/2006 | Golander |
| 2007/0073920 A1 | 3/2007 | Wu et al. |
| 2007/0174495 A1 | 7/2007 | Tung |
| 2008/0034153 A1 | 2/2008 | Lee et al. |
| 2008/0126684 A1 | 5/2008 | Wu et al. |
| 2008/0140910 A1 | 6/2008 | Flynn et al. |
| 2008/0250195 A1 | 10/2008 | Chow et al. |
| 2008/0270681 A1 | 10/2008 | Van Acht et al. |
| 2009/0002761 A1 | 1/2009 | La et al. |
| 2009/0070520 A1 | 3/2009 | Mizushima |
| 2009/0100307 A1 | 4/2009 | Lee |
| 2009/0138654 A1 | 5/2009 | Sutardja |
| 2009/0150605 A1 | 6/2009 | Flynn |
| 2009/0287876 A1 | 11/2009 | Yeh |
| 2009/0300318 A1 | 12/2009 | Allen et al. |
| 2010/0146171 A1 | 6/2010 | Takemae |
| 2010/0268864 A1 | 10/2010 | Ramiya Mothilal |
| 2011/0055668 A1 | 3/2011 | Kim et al. |
| 2011/0131354 A1 | 6/2011 | Smith |

FOREIGN PATENT DOCUMENTS

| | | |
|---|---|---|
| EP | 0502211 | 9/1992 |
| EP | 1271332 | 1/2003 |
| EP | 1840722 | 10/2007 |
| JP | 2004110436 | 4/2004 |
| JP | 2004110438 | 4/2004 |
| JP | 2007034581 | 2/2007 |
| JP | 2008158991 | 7/2008 |

OTHER PUBLICATIONS

Express Apps—PEX 8311 ' by PLX Technology, Jan. 2006.
Wikipedia—Microcontroller article found on http://web.archive.org from Nov. 27, 2007.
Advanced Semiconductor Memories Architecture, Designs, and Applications, Ashok Sharma, IEEE Press, 2003, at 393-401.
Gupta, A. et al: DFTL: A Flash Translation Layer Employing Demand—based Selective Caching of Page—level Address Mappings. In: Proceedings of the 14th international conference on Architectural support for programming languages and operating systems, ASPLOS '09, Mar. 7-11, 2009, Washington, DC, USA. pp. 229-240.

* cited by examiner

VIRTUALIZATION OF CHIP ENABLES

BACKGROUND OF THE INVENTION

Various types of memories are designed to be erased and programmed in large sections of the memory, and are generally referred to as flash memory. Such memory devices can sustain a limited number of erase cycles during their operational lifespan. The number of erase cycles that a flash memory can sustain and continue to reliably operate may be expressed as the endurance of the memory device. Generally, a given memory cell of a flash memory device can currently be erased between 10,000 and 100,000 times before it fails to reliably operate. The endurance of a memory device may depend on the semiconductor processes used to manufacture the device, and the architecture of the memory device.

Flash memory is common in various conventional electronic devices. When the endurance of the flash memory is exceeded, the performance of the flash memory and/or the electronic device containing the flash memory may be adversely impacted, or it may even stop operating. Accordingly, there is a continued need for improving the endurance of memory device such as flash memory.

In addition, flash memory devices come in various geometries and sizes, requiring different ECC protection, use different protocols, operate in single data rate (SDR) and/or double data rate (DDR) mode. Accordingly, there is continued need for improving the controller interface to operate with different flash memory devices.

SUMMARY OF THE INVENTION

Embodiments of the present technology are directed to virtualization of chip enable techniques. In one embodiment, a method of chip enable virtualization includes receiving a memory access request including a logical address. A virtual chip enable number in the logical address is converted to a physical chip enable utilizing a virtual chip enable data structure. One or more operating parameters are also determined from the virtual chip enable data structure. The logical address is then translated to a physical address. Thereafter, an applicable memory device may be enabled using the physical chip enable, and the memory access request may be routed to the applicable memory device where it is executed using the applicable operating parameters.

In another embodiment, a device includes a plurality of block programmable memory devices and a memory controller. The memory controller includes a virtual chip enable cache storing a plurality of virtual chip enable entries, wherein each entry includes a virtual chip enable number, a device identifier and operating parameters of a corresponding block programmable memory device.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
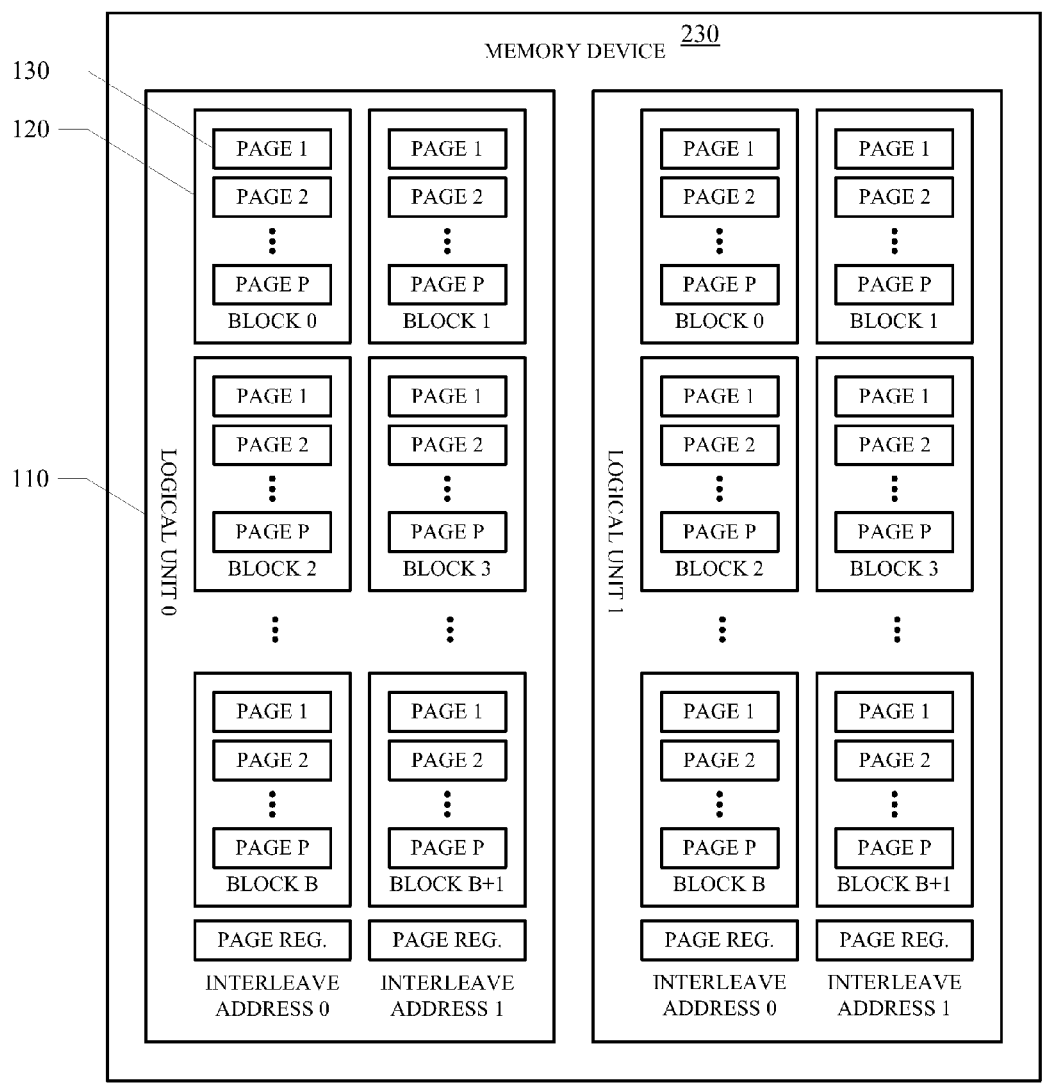
FIG. 1 shows a block diagram of an exemplary block programmable memory device, in accordance with one embodiment of the present technology.

Referring to FIG. 1, an exemplary block programmable memory device, in accordance with one embodiment of the present technology, is shown. The exemplary memory device 230 may be a flash memory device or the like. The block programmable memory device includes a large plurality of memory cells arranged in an array. The array of memory cells may be arranged in one or more logical units (LUNs) 110. Each LUN 110 includes a collection of interleaved physical blocks 120 of memory cells. Each physical block 120 includes a plurality of pages 130 (e.g., a specified number of memory cells). In one implementation, the physical blocks 120 may include a power of two pages (e.g., a multiple of 32 pages). A page 130 of memory cells may include a power of two memory cells (e.g., storing a multiple of 8 bits). The pages may be from 2 kilobytes to 512 megabytes or more, and are typically 4 kilobytes to 64 kilobytes in size. Each memory cell typically stores one or more bits. For example, a single-level cell (SLC) stores one bit of data and a multi-level cell (MLC) may stored two or more bits of data.

The circuit and memory cell architecture of the flash memory is such that new data is written to erased physical blocks 120 of the flash memory 230. Generally, if data is to be written to a physical block 120 that already contains data, then the physical block 120 has to be erased before the new data is programmed. If the blocks 120 of a flash memory 230 are accessed and written directly from software, non-uniform address patterns can result in unequal numbers of erasures across the plurality of physical blocks 120 of the memory 230. For example, if memory at one address is continuously written to, than the number of erasures would eventually exceed the endurance limit of the given physical block 120. Exceeding the endurance limit of the block 120 would reduce the operating lifetime of the flash memory device 230.

Figure 2:
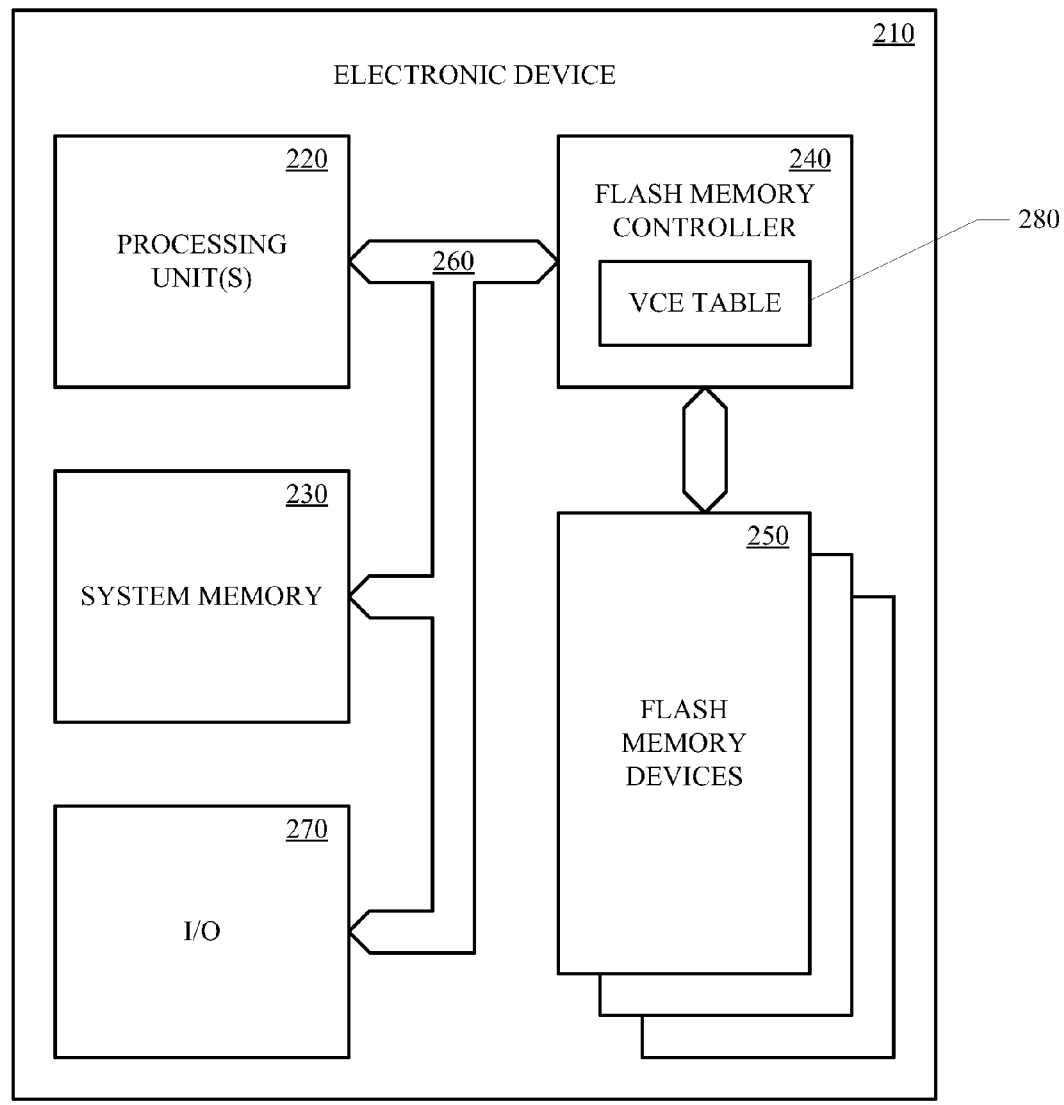
FIG. 2 shows a block diagram of an exemplary electronic device, in accordance with one embodiment of the present technology.

Referring now to FIG. 2, an exemplary electronic device, in accordance with one embodiment of the present technology, is shown. The electronic device 210 may be a computer, laptop computer, cell phone, smart phone, portable music player (e.g., MP3 player), personal digital assistant, netbook computer, ebook, game console, portable game player, set-top box, satellite receiver, navigation system, digital video recorder (e.g., DVR), server computer, and/or the like.

The electronic device 210 includes one or more processing units 220 communicatively coupled to system memory 230, a memory controller 240 and a plurality of block programmable memory devices 260 by one or more communication buses 260. The electronic device 210 may also include other circuits, such as input/output devices 270 and the like. In one implementation, the plurality of block programmable memory devices 250 may be flash memory devices. The flash memory devices may be Open NAND Flash Interface (ONFI) compliant devices. In one implementation, the memory controller 240 may enable access to the system memory 230, the block programmable memory devices 250 and other memory devices of the electronic device 210. In another implementation, the electronic device 210 may include a plurality of memory controllers, wherein one of the memory controllers is a dedicated block programmable memory controller 240. One or more of the block programmable memory devices 250 may be internal or external to the electronic device 210. The memory controller 240 may be integral to one or more other circuits of the electronic device 210 or may be a discrete device. For example, the memory controller may be integral to one or more memory devices, one or more processors, one or more other circuits (e.g., northbridge chip, graphics processing unit) and/or may be a separate dedicated controller.

The one or more block programmable memory devices 250 may have different operating parameters. For example, the flash memory devices may have different storage capacity (e.g., pages, blocks, spare blocks), have different timing requirements, use different protocols, require different error correcting code (ECC) protection, operate in single data rate (SDR) or double data rate (DDR) mode, may be single-level cell (SLC) or multi-level cell (MLC) devices, and/or the like. The same electronic device 210 may also be manufactured with one or more types of block programmable memory devices 250 at one time, and one or more different types of block programmable memory devices at another time. The memory controller 240 may also be utilized in other electronic devices with the same or different block programmable memory devices.

Although embodiments of the present technology are described herein with reference to a block programmable memory device and more particularly with reference to a flash memory device, the embodiments of the present technology may also be practiced with any other integrated circuit (IC) memory device. Embodiments of the present technology may be utilized with a plurality of integrated circuit memory devices, wherein the memory devices may have non-homogeneous operating parameters.

The memory controller 240 may be implemented by one or more means, such as hardware, firmware, and/or computing device readable instructions (e.g., software) and a processing unit (e.g., microcontroller), wherein the computing device readable instructions when executed by the processing unit cause the processing unit to perform one or more processes including chip enable (CE) virtualization. In one implementation, the memory controller 240 is a non-volatile memory host controller interface (NVMCHI).

The memory controller 240 implements virtualization of chip enables to support abstraction of a plurality of block programmable memory devices 250 that may be the same or different from one another. The memory controller 240 performs operations on virtual chip enables (CE), rather than the physical chip enables. The virtual chip enables (VCE) can be specified in a VCE data structure 280 that the memory controller 240 programs after an initial discovery process. Each VCE entry may include a VCE number (e.g., tag), a device identifier, and one or more operating parameters of the block programmable memory devices. The device identifier may identify a physical or logical device, or physical or logical partition of the device. For example, the device identifier may be decoded to select a physical chip enable (CD) pin of a device, to select a logical unit (LUN) within a device, and/or the like. A given VCE may cover multiple physical memory devices. In addition, two VCEs may cover a single physical memory device. Accordingly, a virtual chip enable may be associated with one or more logical or physical partitions of one or more block programmable memory devices. The operating parameters, of the block programmable memory devices 250, may include information regarding pin mappings, geometry (e.g., page size, sector size, number of logical unit, number of blocks per logical units, number of pages per block and the like), degree of ECC protection, protocol use and/or the like. In one implementation, firmware of the memory controller operates on virtual chip enables (VCEs) as logical targets, while hardware of the memory controller enforces correct routing and functionality.

A memory controller, such as a non-volatile memory host interface controller (NVMHCI), may present to an operating system (OS) a concept of a port to present a single entity of storage. Accordingly, virtualization of chip enables advantageously allows the grouping of non-homogeneous block programmable memory devices into a single NVMHCI port.

In an exemplary implementation, the electronic device may include both multi-level cell (MLC) and single level cells (SLC) on the same flash memory die. The type of flash memory is determined by the address. However, wear-leveling algorithms typically operate on full chip enables (CEs) or logical units (LUNs). Virtualization of the chip enables allows wear-leveling algorithms to be applied across a plurality of non-homogeneous block programmable memory devices. Virtualization of the chip enables allows the same level of abstraction to be maintained regardless of how the flash devices are physically partitioned. In the chip enable virtualization techniques, a single physical chip enable (CE) can be split into separate fully independent virtual chip enables when presented to the memory controller. The memory controller utilizes the virtual chip enable data structure to apply the correct ECC, size operations, and the like to access both the multi-level cells and single level cell partitions without the operating system having to know the corresponding parameters of the flash memory device. In another implementation, virtualization of chip enables re-mapping to give the memory controller a way to manage more chip enables than there are hardware resources.

Figure 3A:
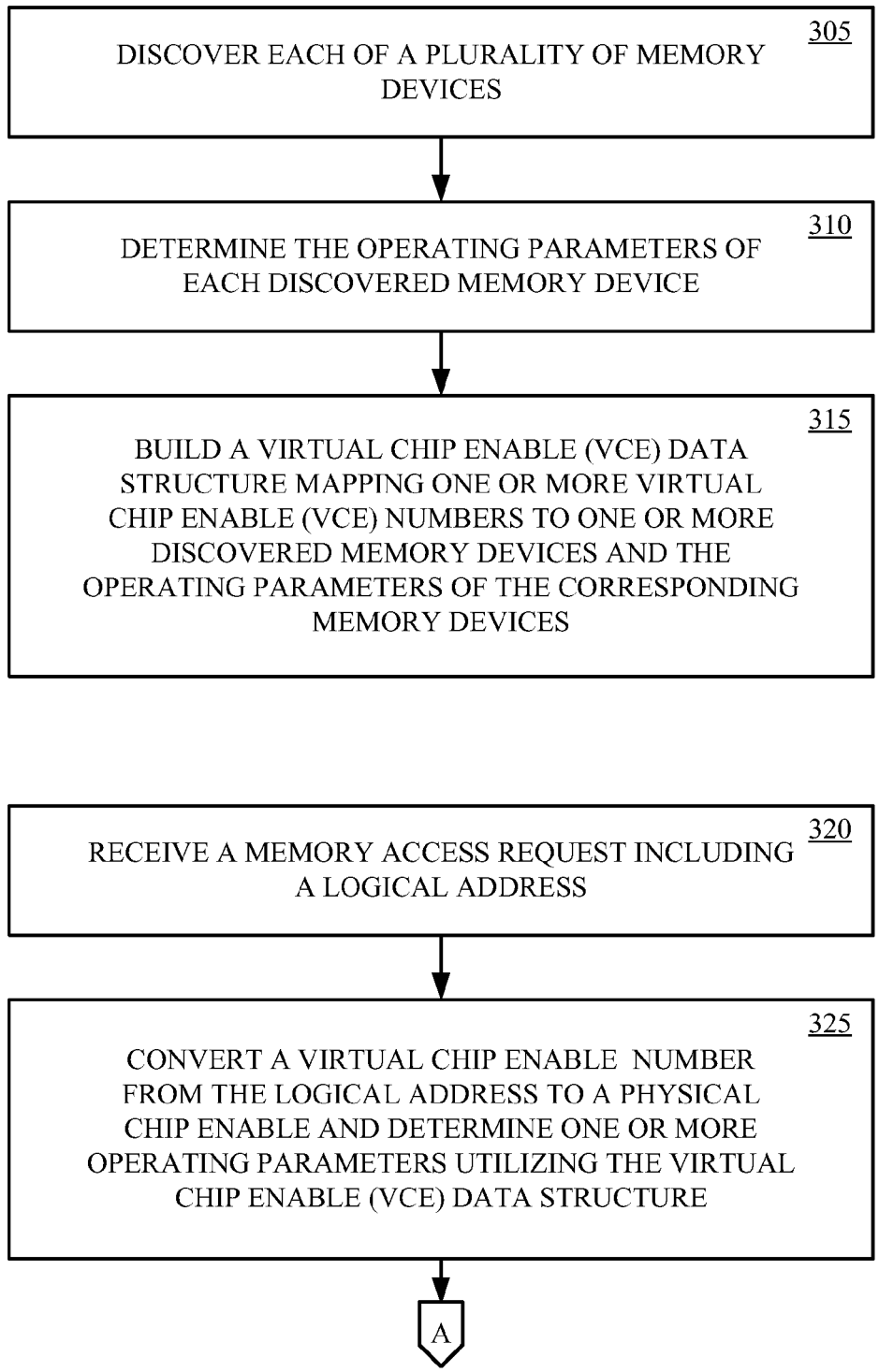
FIGS. 3A and 3B show a flow diagram of a method of chip enable virtualization, in accordance with one embodiment of the present technology.
Figure 3B:
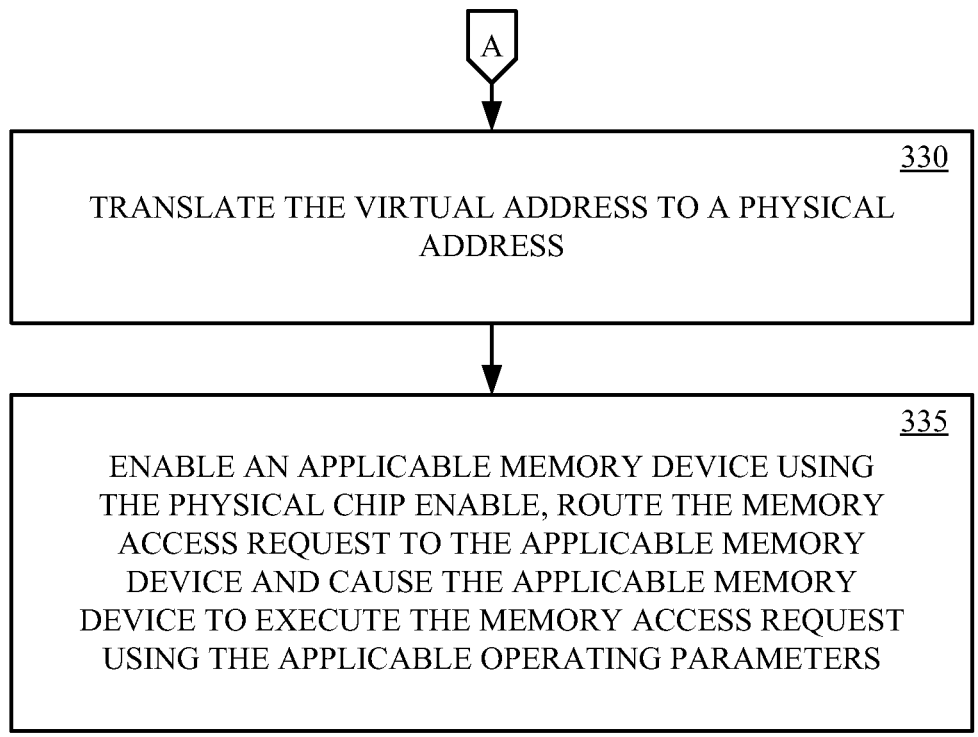

Referring now to FIGS. 3A and 3B, a method of chip enable virtualization, in accordance with one embodiment of the present technology, is shown. The method may be embodied in computing device readable instructions, stored on one or more computing device readable media (e.g., memory), which if executed by a processing unit perform one or more processes including chip enable (CE) virtualization. The method may also be implemented in hardware and/or firmware. The method includes a setup phase and a memory access phase. In the setup phase, each of a plurality of block programmable memory devices is discovered, at 305. In one implementation, a memory controller of an electronic device discovers each of a plurality of block programmable memory devices of the electronic device. For each block programmable memory device discovered, the operating parameters are determined, at 310. In one implementation, the memory controller determines the operating parameters of each block programmable memory device.

The operating parameters, of the block programmable memory devices, may include information regarding pin mappings, page size, sector size, number of logical unit, number of blocks per logical units, number of pages per block, degree of ECC protection, protocol use and/or the like. At 315, a virtual chip enable (VCE) data structure is built. In one implementation, the memory controller builds a virtual chip enable (VCE) data structure. The virtual chip enable (VCE) data structure includes one or more virtual chip enable (VCE) entries for one or more of the discovered block programmable memory devices. Each virtual chip enable (VCE) entries may include a VCE number (e.g., tag), a device identifier, and one or more operating parameters of the corresponding block programmable memory device. The device identifier may identify a physical or logical device, or a physical or logical partition of the device.

After the setup phase is completed, the memory controller may operate in the memory access phase. In the memory access phase, a memory access request including a logical address is received, at 320. The memory access request may be received by the memory controller from an operating system or application running on the electronic device. At 325, a VCE number in the logical address is converted to a device identifier of one or more flash memory devices, and applicable operating parameters for the corresponding physical memory device are determined using the virtual chip enable data structure. In one implementation, the flash memory controller converts a VCE number to a chip enable and determines the applicable operating parameters using the virtual chip enable data structure. At 330, the logical address is translated to a physical address. The logical address may be translated to a physical address across one or more physical or logical devices using a given wear-leveling algorithm. In one implementation, the memory controller also translates the logical address to a physical address utilizing a page table, translation look-aside buffer and/or the like. At 335, the applicable block programmable memory device is enabled using the physical chip enable, the memory access command is routed to the applicable memory device, and thereafter the applicable memory device executes the memory access request using the applicable operating parameters. In one implementation, the memory controller enables the applicable block programmable memory device using the device identifier, routes the memory access command to the applicable memory device, and causes the applicable memory device to execute the memory access request using the applicable operating parameters The virtual chip enable is a construct that advantageously includes the attributes that correspond to a unique target for the memory controller. The attributes may be utilized to access the corresponding memory device, implement a wear-level algorithm, provide for operation of a non-volatile memory host controller interface (NVMHCI), and the like. Embodiments advantageously allow block programmable memory device, running at different speeds, protocol standards and/or the like, to be mixed and matched on a system.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. One or more non-transitory computing device readable media having instructions stored thereon that, if executed by one or more processing units, perform a method comprising:
   receiving a memory access request including a logical address;
   converting a virtual chip enable, from the logical address, to a physical chip enable utilizing a virtual chip enable data structure, and determining one or more operating parameters utilizing the virtual chip enable data structure for the physical chip enable, wherein the virtual chip enable data structure maps one of the plurality of virtual chip enables to a plurality of memory devices or maps two or more virtual chip enables to one of a plurality of memory devices, and wherein the virtual chip enable data structure relates each of a plurality of chip enables to physical chip enables and one or more operating parameters of a corresponding block programmable memory device;
   translating the logical address to a physical address utilizing an address translation data structure; and
   enabling one of the plurality of memory devices using the physical chip enable converted from the virtual chip enable number utilizing the virtual chip enable data structure, routing the memory access request to the enabled memory device using the physical address translated utilizing the address translation data structure and causing the enabled memory device to execute the memory access at the physical address using the one or more operating parameters determined utilizing the virtual chip enable data structure.

2. One or more non-transitory computing device readable media according to claim 1, further comprising translating the logical address to a physical address using a wear-leveling algorithm.

3. One or more non-transitory computing device readable media according to claim 1, further comprising:
   discovering each of the plurality of memory devices;
   determining operating parameters of each discovered memory device; and
   building the virtual chip enable data structure including a plurality of virtual chip enable entries, each including a virtual chip enable number, a physical chip enable number and operating parameters for mapping each discovered memory device.

4. One or more non-transitory computing device readable media according to claim 3, wherein a given virtual chip enable covers multiple physical memory devices.

5. One or more non-transitory computing device readable media according to claim 3, wherein a given plurality of virtual chip enables cover a single physical memory device.

6. A device comprising:
   a plurality of block programmable memory devices; and
   memory controller, communicatively coupled to the plurality of block programmable memory devices, including
      a virtual chip enable cache storing a plurality of virtual chip enable entries, wherein each entry includes a mapping of a virtual chip enable number, a device identifier and operating parameters corresponding to one or more of the plurality of block programmable memory devices, wherein the memory controller, converts a virtual chip enable number from a logical address of a received memory access request to a physical chip enable utilizing the virtual chip enable data structure, determines one or more operating parameters utilizing the virtual chip enable data structure, translates the logical address to a physical address utilizing an address translation data structure, and enables one of the plurality of block programmable memory devices using the physical chip enable convened from the virtual chip enable number utilizing the virtual chip enable data structure, routes the received memory access request to the enabled memory device using the physical address translated utilizing the address translation data structure and causes the enabled block programmable memory device to execute the memory access request using the one or more operating parameters determined utilizing the virtual address structure.

7. The device of claim 5, wherein a given virtual chip enable covers multiple physical memory devices.

8. The device of claim 6, wherein a given plurality of virtual chip enables cover a single physical memory device.

9. The device of claim 6, wherein the memory controller comprises a non-volatile memory host interface controller (NVMHCI).

10. The device of claim 6, wherein the plurality of block programmable memory devices comprise flash memory devices.

11. The device of claim 6, wherein the plurality of block programmable memory devices comprise Open NAND Flash Interface (ONFI) memory devices.

12. The device of claim 6, wherein the operating parameters of at least two of the block programmable memory devices are non-homogeneous.

13. A device comprising:
a means for discovering each of a plurality of memory devices;
a means for determining operating parameters of each discovered memory device;
a means for building, a virtual chip enable data structure mapping one or more virtual chip enable numbers corresponding to each discovered memory device and the operating parameters corresponding to each discovered memory device, wherein the virtual chip enable data structure maps one of the plurality of virtual chip enable numbers to a plurality of memory device or maps two or more virtual chip enable numbers to one of a plurality of memory devices, and wherein the virtual chip enable data structure relates each of a plurality of virtual chip enable numbers to a physical chip enable and one or more operating parameters of a corresponding block programmable memory device.

14. The device of claim 13, further comprising:
a means for receiving a memory access request including a logical address;
a means for convening a virtual chip enable number from the logical address to a physical chip enable utilizing, the virtual chip enable data structure and determining one or more operating parameters utilizing a virtual chip enable data structure;
a means for translating the logical address to a physical address utilizing an address translation data structure; and
a means for enabling one of the plurality of memory devices using the physical chip enable converted from the virtual chip enable number utilizing the virtual chip enable data structure, routing the memory access request to the enabled memory device using the physical address translated utilizing the address translation data structure and causing the enabled memory device to execute the memory access request using one or more operating parameters determined utilizing the virtual address data structure.

15. The device of claim 13, wherein the operating parameters include one or more selected from the group consisting of page parameter, block, parameter, sector parameter, logical unit parameter, spare block parameters, bad block parameter, timing parameters, protocol parameters, error correcting code parameter, data rate parameter, programming level parameter, pin mapping parameter, geometry parameter and partition parameter.

16. The device of claim 13, wherein the means for translating the logical address to a physical address further comprises a means for translating the logical address to a physical address according to a wear-leveling algorithm.

17. The device of claim 13, further comprising means for grouping two or more block programmable memory devices into a port.

18. The device of claim 13, further comprising means for managing more block programmable memory device chip enables than there are physical block programmable memory devices.

* * * * *